(12) United States Patent
Sugimoto et al.

(10) Patent No.: US 6,656,584 B1
(45) Date of Patent: Dec. 2, 2003

(54) GLASS FIBER

(75) Inventors: Naoki Sugimoto, Kanagawa (JP); Setsuro Ito, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 63 days.

(21) Appl. No.: 09/718,395

(22) Filed: Nov. 24, 2000

(30) Foreign Application Priority Data

Nov. 26, 1999 (JP) .......................................... 11-335813

(51) Int. Cl.[7] .............................. D02G 3/00; G02B 6/00
(52) U.S. Cl. ....................... 428/392; 428/375; 428/384; 385/142; 501/50; 501/52; 501/77; 501/78
(58) Field of Search ................................. 428/375, 384, 428/388, 373, 392; 385/142; 501/49, 50, 52, 73, 77, 78

(56) References Cited

U.S. PATENT DOCUMENTS

| 3,938,974 A | * | 2/1976 | Macedo et al. | ............. 385/141 |
| 4,861,129 A | * | 8/1989 | Che et al. | .................... 385/122 |
| 5,148,510 A | | 9/1992 | Borrelli et al. | |
| 5,668,066 A | * | 9/1997 | Oguma et al. | ................ 501/45 |
| 2002/0041436 A1 | * | 4/2002 | Kondo et al. | ............ 359/341.5 |

FOREIGN PATENT DOCUMENTS

WO WO 00/23392 4/2000

OTHER PUBLICATIONS

Patent Abstracts of Japan, vol. 2000, No. 02, Feb. 29, 2000, JP 11 317561, Nov. 16, 1999.
Patent Abstracts of Japan, vol. 1999, No. 13, Nov. 30, 1999, JP 11 236245, Aug. 31, 1999.
T. N. Keshishyan, et al. Chemical Abstracts, vol. 95, No. 2, AN 11313s, "Mechanism of the Effect of Oxides of Aluminum, Lanthanum, Barium and Lead on the Elastic Properties of Bismuth–Borate Glasses", Jul. 13, 1981.
W.H. Dumbaugh, et al., Journal of the American Ceramic, vol. 75, No. 9, pps. 2315–2326, "Heavy–Metal Oxide Glass," Sep. 1, 1992.
J.C. Lapp, et al., SPIE, Properties and Characteristics of Optical Glass II, vol. 1327, pps. 162–170, "Recent Advances in Heavy Metal Oxide Glass Research," Jul. 12–13, 1990.

* cited by examiner

Primary Examiner—Cynthia H. Kelly
Assistant Examiner—J. M. Gray
(74) Attorney, Agent, or Firm—Oblon, Spivak, McClelland, Maier & Neustadt, P.C.

(57) ABSTRACT

A glass fiber comprising core glass and clad glass, wherein the core glass consists essentially of from 25 to 70 mol % of $Bi_2O_3$, from 5 to 74.89 mol % of $B_2O_3+SiO_2$, from 0.1 to 30 mol % of $Al_2O_3+Ga_2O_3$, and from 0 to 10 mol % of $CeO_2$.

17 Claims, 2 Drawing Sheets

GLASS FIBER

The present invention relates to a glass fiber having a third order nonlinear optical effect useful for an ultrafast speed optical switch or a wavelength conversion device.

To realize an advanced information processing society or multimedia, it is necessary to process a large quantity of information at an ultrafast speed, and for this purpose, an optical technology is indispensable which takes the place of conventional electronics processing. To realize such optical processing technology, various developments have been made on optical switches to process optical signals by means of light. To operate such optical switches, the third order nonlinear optical effect is utilized whereby the optical properties such as the refractive index and the transmittance of a material can be changed by light.

Further, as a system to increase the transmission capacity, a wavelength division multiplexing communication system (WDM) has been proposed. In this system, in order to increase the transmission capacity, the channel is multiplexed by changing the wavelength. Accordingly, in this system, it is desired that the wavelength conversion from a certain wavelength to other wavelength is easy, and for this purpose, four wave mixing is suitable which utilizes the third order nonlinear optical effect.

The four wave mixing means that when a pumping light having an angular frequency of $\omega_p$ and a signal light having an angular frequency of $w_s$ enter a third order nonlinear optical material, a light having an angular frequency of $\omega_c$ ($=2\omega_p-\omega_s$) will be generated. By such four wave mixing, the signal light having an angular frequency of $\omega_c$ will be converted to the light having an angular frequency of $\omega_c$. If the third order nonlinear optical effect of the third order nonlinear optical material is large, this angular frequency conversion i.e. the wavelength conversion can effectively be carried out.

A third order nonlinear optical glass so-called a nonresonant type, accompanying no light absorption, such as quartz glass, is known to show a nonlinear response at a high speed of a few picoseconds or less. However, as compared with a third order nonlinear optical glass so-called a resonant type and accompanying light absorption, such as semiconductor-dispersed glass or nano metal particle-dispersed glass, its third order nonlinear optical effect is small. Therefore, in order to use such a nonresonant type third order nonlinear optical glass for an optical switch, it has been necessary to increase the device length or to increase the operation power. For example, when quartz glass is formed into a fiber and an optical switch is prepared therefrom, a switch operation (switching) in from 5 to 20 picoseconds is possible, but in order to obtain a practical optical switch, it has been necessary to make the fiber length to be about 1,000 m. Accordingly, also in the field of the nonresonant type third order nonlinear optical glass, strenuous efforts are being made to develop a glass having a large third order nonlinear optical effect.

On the other hand, JP-A-3-21934 discloses that an As-S type glass known as chalcogen glass, has a large nonlinear optical effect, so that a high speed switching operation at the same level as a quartz glass fiber is possible with a length of about $\frac{1}{1,000}$ of the quartz glass fiber. However, chalcogen glass has had a problem such that it is necessary to control the atmosphere during the preparation of the glass, the process for preparing the glass tends to be cumbersome for the control of the discharge out of the system of As, Se, S, etc., or the glass transition temperature is low, the thermal stability is poor, and the optical damage threshold is inferior.

Further, as a wavelength-conversion fiber, a quartz fiber doped with germanium has been reported. However, the third order nonlinear optical effect is small, and to use it as an optical switch, it is still required to have a length of about 1,000 m.

It is an object of the present invention to provide a glass fiber which does not contain any one of As, S and Se and which can be prepared by a conventional process for preparing glass and wherein a glass having a large third order nonlinear optical effect is used as the core glass.

The present invention provides a glass fiber comprising core glass and clad glass, wherein the core glass consists essentially of from 25 to 70 mol % of $Bi_2O_3$, from 5 to 74.89 mol % of $B_2O_3+SiO_2$, from 0.1 to 30 mol % of $Al_2O_3+Ga_2O_3$, and from 0 to 10 mol % of $CeO_2$.

Figure 1:
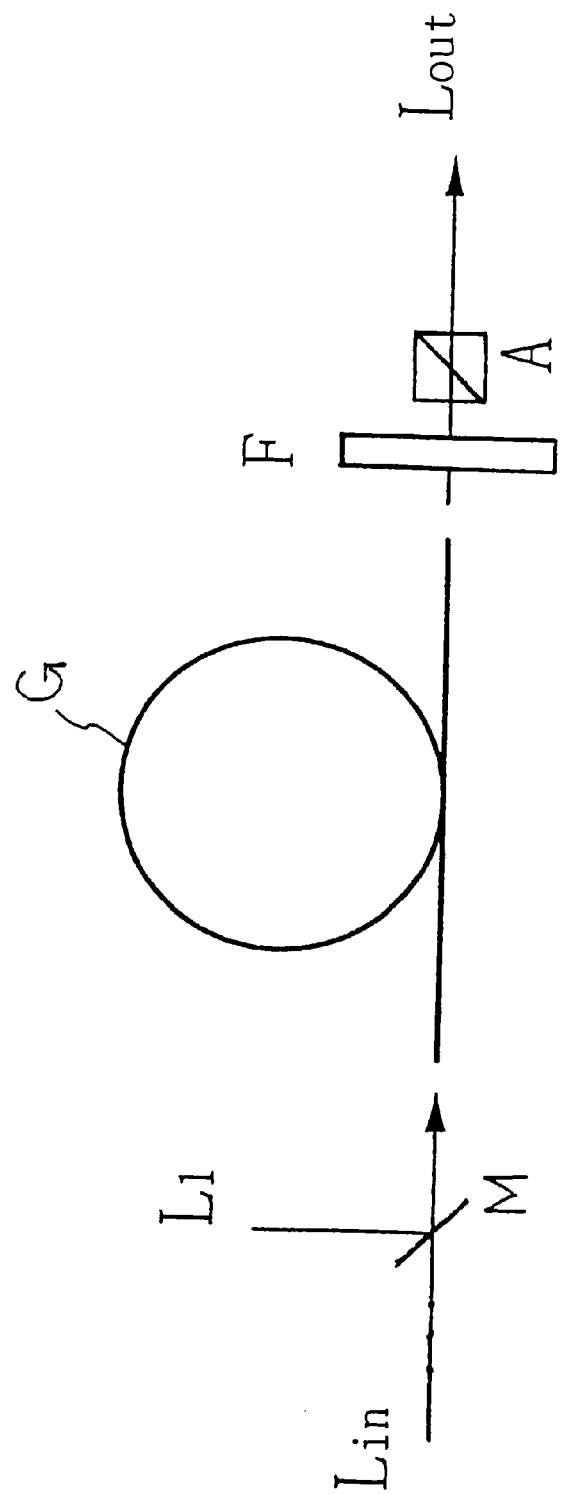
FIG. 1 is a view illustrating the arrangement of a polarizing rotary optical switch device employing the glass fiber of the present invention.

The core glass of the glass fiber of the present invention (hereinafter referred to simply as the core glass of the present invention) preferably consists essentially of 39 to 50 mol % of $Bi_2O_3$, from 20 to 55 mol % of $B_2O_3+SiO_2$, from 5 to 25 mol % of $Al_2O_3+Ga_2O_3$, and from 0.01 to 10 mol % of $CeO_2$. For example, a glass comprising 42.8 mol % of $Bi_2O_3$, 35.6 mol % of $SiO_2$, 3.6 mol % of $Al_2O_3$, 17.8 mol % of $Ga_2O_3$ and 0.2 mol % of $CeO_2$, may be mentioned.

The composition of the core glass of the glass fiber of the present invention will be described in detail wherein mol % will be represented simply by %.

If the content of $Bi_2O_3$ is less than 25%, the third order nonlinear optical effect tends to be too small. It is preferably at least 35%, more preferably at least 39%, particularly preferably at least 40%. If it exceeds 70%, vitrification tends to be difficult, or crystals are likely to precipitate during the preparation of a fiber, whereby the preparation of the fiber tends to be difficult. It is preferably at most 65%, more preferably at most 55%, particularly preferably at most 50%.

Each of $B_2O_3$ and $SiO_2$ is a network former, and at least one of them must be contained. If the total content of $B_2O_3$ and $SiO_2$ is less than 5%, vitrification tends to be difficult, or preparation of a fiber tends to be difficult. It is preferably at least 20%, more preferably at least 25%, particularly preferably at least 30%. If the total content exceeds 74.89%, the third order nonlinear optical effect tends to be too small. It is preferably at most 65%, more preferably at most 60%, particularly preferably at most 55%, most preferably at most 50%.

When $B_2O_3$ is contained, its content is preferably at least 1%, more preferably at least 10%, particularly preferably at least 20%. Further, such content is preferably at most 40%, more preferably at most 35%.

When $SiO_2$ is contained, its content is preferably at least 1%, more preferably at least 5%, particularly preferably at least 10%. Further, such content is preferably at most 45%, more preferably at most 40%.

Each of $Al_2O_3$ and $Ga_2O_3$ is a component to suppress crystallization during the preparation of a fiber, and at least one of them must be contained. If the total content of $Al_2O_3$ and $Ga_2O_3$ is less than 0.1%, the above-mentioned effect for suppressing the crystallization tends to be small. The total content is preferably at least 1%, more preferably at least 5%. If it exceeds 30%, crystallization is likely to take place during the preparation of the glass. It is preferably at most 28%, more preferably at most 25%.

When $Al_2O_3$ is contained, its content is preferably at least 1%, more preferably at least 3%, particularly preferably at least 5%. Further, such content is preferably at most 20%, more preferably at most 15%.

When $Ga_2O_3$ is contained, its content is preferably at least 1%, more preferably at least 3%, particularly preferably at least 5%. Further, such content is preferably at most 25%, more preferably at most 20%.

$CeO_2$ is not essential, but has an effect to suppress precipitation of $Bi_2O_3$ as metal bismuth in the molten glass, and to suppress deterioration of the transparency of the glass, and thus it may be contained up to 10%. If it exceeds 10%, glass formation tends to be difficult, or the third order nonlinear optical effect tends to decrease. It is preferably at most 2%, more preferably at most 1%, particularly preferably at most 0.5%. $CeO_2$ is a component which tends to color the glass with yellow color or orange color. When it is desired to avoid deterioration of the transmittance due to such coloring, it is preferred for the glass not to contain $CeO_2$.

When $CeO_2$ is contained, its content is preferably at least 0.01%. If it is less than 0.01%, the effect to suppress deterioration of the transparency of the glass due to precipitation of metal bismuth tends to be small. It is preferably at least 0.1%.

The core glass of the present invention preferably contains from 40 to 50% of $Bi_2O_3$, from 0 to 35% of $B_2O_3$, from 10 to 40% of $SiO_2$, from 0 to 15% of $Al_2O_3$, from 0 to 20% of $Ga_2O_3$ and from 0 to 10% of $CeO_2$. Here, "contains 0% of a component" means that said component is not essential.

The glass of the present invention consists essentially of the above components, but may further contain other components in a total amount of 10 mol % within a range not to impair the purpose of the present invention. Such "other components" may, for example, be $Li_2O$, $Na_2O$, $K_2O$, $MgO$, $CaO$, $SrO$, $BaO$, $ZnO$, $TiO_2$, $WO_3$, $SnO_2$ and $TeO_2$.

Further, it is preferred that none of As, S and Se is contained. Further, Er absorbs lights in wavelength regions of 980 nm band and 1,550 nm band to lower the transmittance in such wavelength regions, and accordingly, should not better be contained.

The relation represented by the following formula should better be satisfied between the refractive index $n_2$ of the clad glass and the refractive index $n_1$ of the core glass of the glass fiber of the present invention:

$$0.0005 \leq (n_1-n_2)/n_1 \leq 0.1$$

Further, the clad glass of the glass fiber of the present invention preferably consists essentially of from 25 to 70% of $Bi_2O_3$, from 5 to 74.89% of $B_2O_3+SiO_2$, from 0.1 to 30% of $Al_2O_3+Ga_2O_3$ and from 0 to 10% of $CeO_2$. When the core glass of the present invention contains from 0.1 to 10% of $CeO_2$, it is more preferred that $CeO_2$ in the above preferred clad glass is from 0.1 to 10%.

The method for preparing the glass fiber of the present invention is not particularly limited. For example, it can be prepared as follows. The prescribed starting materials are mixed, put into a gold crucible, a platinum crucible, an alumina crucible, a quartz crucible or an iridium crucible and melted in air at a temperature of from 800 to 1,300° C. The obtained melt is cast in a prescribed mold to obtain a preform combined with clad glass. This preform is drawn to obtain a glass fiber. Otherwise, the above melt is formed into a plate, followed by extrusion molding to obtain a preform, and a glass fiber may be prepared by using this preform.

In the present invention, a nonresonant type third order nonlinear optical effect is utilized. Namely, polarization formed only when light is irradiated, is utilized. Accordingly, the switch operation can be carried out within a time equal to or less than the pulse width of a laser beam to be used, and within such a time, wavelength conversion can be carried out by four wave mixing. Further, as the third order nonlinear optical effect is large, the switch operation or the wavelength conversion can be efficiently carried out with a low power.

With the optical switch device employing the glass fiber of the present invention, it is possible to carry out a switch operation in a time equal to the pulse width of a laser beam to be used for the optical switch. Further, a wavelength conversion device employing the glass fiber of the present invention has a high wavelength conversion efficiency. Typically, it is believed that by the fiber glass of the present invention having a length of not more than 100 m, any desired wavelength conversion can be carried out.

Now, the present invention will be described in further detail with reference to Examples. However, it should be understood that the present invention is by no means restricted to such specific Examples.

Glass fibers of Examples 1, 2, 4 and 5 were prepared which comprised core glass and clad glass having compositions shown by mol % in the lines for from $Bi_2O_3$ to $CeO_2$ in Table 1, wherein the clad diameter was 125 μm, and the diameter (unit: μm) of the core glass was as shown in Table 1. The refractive index at a wavelength of 1.55 μm is also shown in Table 1.

TABLE 1

|  | Ex. 1 Core | Ex. 1 Clad | Ex. 2 Core | Ex. 2 Clad | Ex. 4 Core | Ex. 4 Clad | Ex. 5 Core | Ex. 5 Clad |
|---|---|---|---|---|---|---|---|---|
| $Bi_2O_3$ | 43.4 | 43.4 | 36 | 35 | 47.6 | 46.6 | 44.4 | 42.8 |
| $B_2O_3$ | 28 | 28 | 10 | 10 | 24 | 24 | 27.5 | 28.5 |
| $SiO_2$ | 14.2 | 14.2 | 50 | 51 | 14 | 15 | 20.8 | 21.4 |
| $Al_2O_3$ | 7.1 | 10.7 | 2 | 2 | 14.2 | 14.2 | 0 | 0 |
| $Ga_2O_3$ | 7.1 | 3.5 | 0 | 0 | 0 | 0 | 6.9 | 7.1 |
| $CeO_2$ | 0.2 | 0.2 | 2 | 2 | 0.2 | 0.2 | 0.2 | 0.2 |
| Refractive index | 2.04 | 2.03 | 1.89 | 1.88 | 2.05 | 2.03 | 2.03 | 2.02 |
| Diameter | 4 | — | 4 | — | 3 | — | 10 | — |

The optical switch operation test of the glass fiber of Example 5 was carried out using a polarization rotary optical switch device, the arrangement of which is shown in FIG. 1.

$L_1$ is a control light, which is a laser beam with a wavelength of 1.3 μm, a pulse width of 120 femtoseconds, a pulse energy of 600 pJ and a polarization direction of 45° against the below-mentioned signal light $L_{in}$.

$L_{in}$ is a signal light, which is a laser beam with a wavelength of 1.07 μm, a pulse width of 120 femtoseconds and a pulse energy of 13 pJ and which has been made to have horizontal polarization by a polarizer.

The above polarizer and an analyzer A were disposed to be a crossed Nicols disposition (extinction ratio: 24 dB). Here, the extinction ratio is a ratio of the light intensity in the open Nicols disposition to the light intensity in the crossed Nicols disposition.

G represents the glass fiber, and the glass fiber of Example 5 having a length of 25 mm was used.

By a half mirror M, $L_1$ and $L_{in}$ were combined, and the combined light was admitted into the glass fiber G. When there was no control light $L_1$, the signal light $L_{in}$ did not substantially pass through the analyzer A, whereby the pulse energy of the signal light $L_{in}$ passed through the analyzer A was as small as 0.05 pJ. On the other hand, when the control light $L_1$ was admitted to the half mirror M, the signal light $L_{in}$ passed through the analyzer A. The pulse energy of the transmitted light $L_{out}$ was 0.6 pJ. When evaluated as a S/N ratio, this corresponds to 10 dB, which indicates that such is sufficiently useful as an optical switch device. Further, the control light $L_1$, emitted from the glass fiber G is cut off by a filter F.

Further, it was attempted to measure the switch operation time by giving a time delay between the control light $L_1$ and the signal light $L_{in}$, whereby the signal light $L_{in}$ passed through the analyzer A only when the pulse of the control light $L_1$ and the pulse of the signal light $L_{in}$ were timely overlapped. This indicates that the switch operation time is not longer than the pulse width (=120 femtoseconds) of the control light $L_1$.

Further, it is considered that, for example, an optical switch wherein the control light $L_1$ has a wavelength of 1.5 μm, a pulse width of 150 femtoseconds and a pulse energy of 10 nJ, the signal light $L_{in}$ has a wavelength of 1.6 μm, a pulse width of 150 femtoseconds and a pulse energy of 100 pJ, and the glass fiber G is a glass fiber (length=1 m) of any one of Examples 1, 2 and 4, also has a sufficient optical switch function.

Further, it is considered that even if the control light $L_1$ has a wavelength of 1.48 μm, a pulse width of 150 femtoseconds and a pulse energy of 20 pJ, and the signal light $L_{in}$ has a wavelength of 1.55 μm, a pulse width of 150 femtoseconds and a pulse energy of 1 pJ, if the glass fiber G is a glass fiber (length=1 m) of any one of Examples 1, 2, 4 and 5, such an optical switch device has a sufficient optical switch function.

Figure 2:
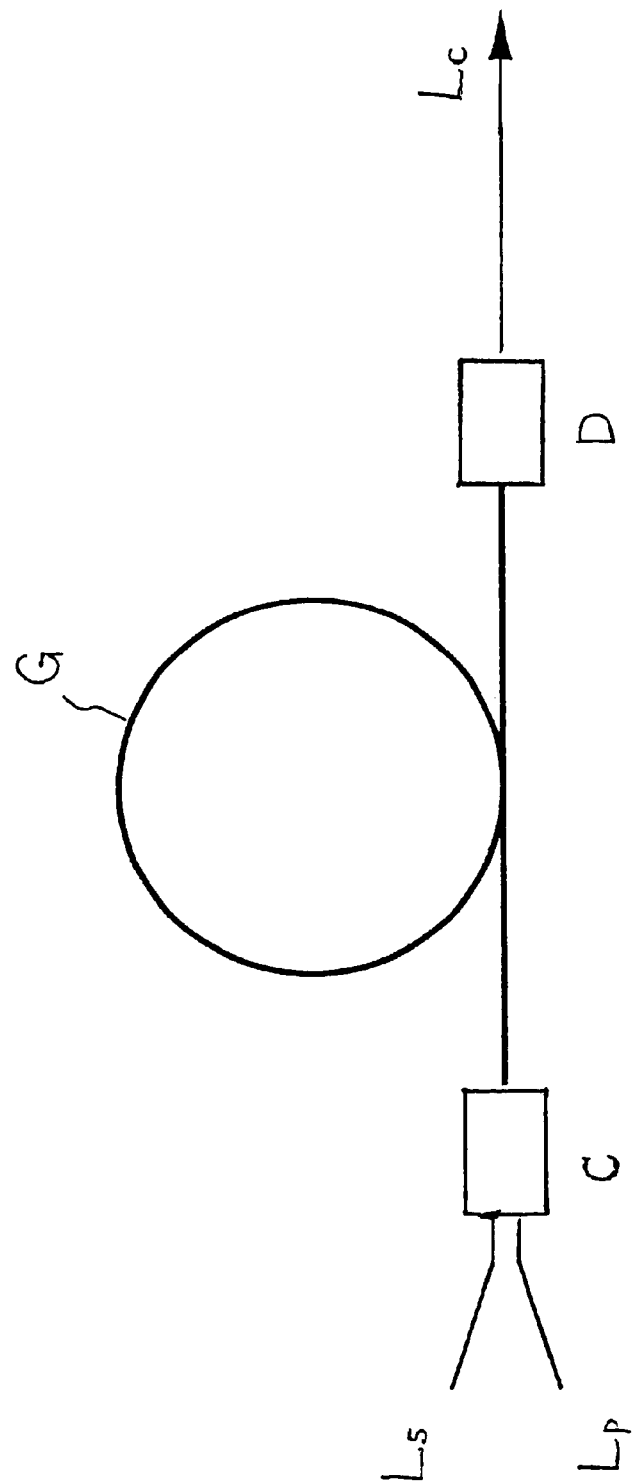
FIG. 2 is a view i.e. lustrating the arrangement of a wavelength conversion device employing the glass fiber of the present invention.

Further, an arrangement which is considered to be suitable for a wavelength conversion device employing a glass fiber of any one of Examples 1, 2 and 4 or Example 5, is shown in FIG. 2.

$L_s$ is a signal light, which is a laser beam with a wavelength of 1.57 μm, a pulse width of 50 picoseconds, a repetitive frequency of 2.5 GHz, and an average intensity of 0.1 mW. $L_P$ is a pumping light, which is a laser beam with a wavelength of 1.56 μm, a pulse width of 60 picoseconds, a repetitive frequency of 2.5 GHz and an average intensity of 10 mW. G is a glass fiber, and a glass fiber of any one of Examples 1, 2, 4 and 5 having a length of 100 m is to be used.

The signal light $L_s$ and the pumping light $L_P$ are combined by a coupler C and irradiated into the glass fiber G. The light emitted from the glass fiber G is separated through a coupler D, whereby a wavelength-shifted light $L_c$ having a wavelength of 1.55 μm is obtained.

The glass fiber of the present invention has a large nonresonant type third order nonlinear optical effect. By carrying out phase modulation or the like of a light beam utilizing this characteristic, it is possible to carry out an optical switch operation in an extremely short time at a level of not more than the pulse width of the incident light, specifically not longer than 1 picosecond (1,000 femtoseconds).

Further, by effective wavelength conversion utilizing four wave mixing, lightwave conversion can be carried out with a shorter glass fiber.

Further, the glass fiber of the present invention is made of a glass material composed solely of oxides, whereby no special atmosphere is required for its preparation, and it can be produced by a conventional glass preparation process.

The entire disclosure of Japanese Patent Application No. 11-335813 filed on Nov. 26, 1999 including specification, claims, drawings and summary are incorporated herein by reference in its entirety.

What is claimed is:

1. A glass fiber comprising core glass and clad glass, wherein the core glass consists essentially of from 25 to 70 mol % of $Bi_2O_3$, from 5 to 74.89 mol % of $B_2O_3+SiO_2$, from 0.1 to 30 mol % of $Al_2O_3+Ga_2O_3$, and from 0 to 10 mol % of $CeO_2$.

2. A glass fiber comprising core glass and clad glass, wherein the core glass consists essentially of from 25 to 70 mol % of $Bi_2O_3$, from 5 to 74.89 mol % of $B_2O_3+SiO_2$, from 0.1 to 30 mol % of $Al_2O_3+Ga_2O_3$, and from 0 to 10 mol % of $CeO_2$, wherein $Bi_2O_3$ is present in the core glass in an amount of from 40 to 50 mol %, $B_2O_3$ is present in the core glass in an amount of from 0 to 35 mol %, $SiO_2$ is present in the core glass in an amount of from 10 to 40 mol %, $Al_2O_3$ is present in the core glass in an amount of from 0 to 15 mol %, and $Ga_2O_3$ is present in the core glass in an amount of from 0 to 20 mol %.

3. The glass fiber according to claim 2, wherein the core glass contains from 0.001 to 10 mol % of $CeO_2$.

4. The glass fiber according to claim 3, wherein the core glass does not contain Er.

5. The glass fiber according to claim 2, wherein the core glass does not contain Er.

6. The glass fiber according to claim 1, wherein the core glass contains from 0.001 to 10 mol % of $CeO_2$.

7. The glass fiber according to claim 3, wherein the core glass does not contain Er.

8. The glass fiber according to claim 6, wherein the clad glass consists essentially of from 25 to 70 mol % of $Bi_2O_3$, from 5 to 74.89 mol % of $B_2O_3+SiO_2$, from 0.1 to 30 mol % of $Al_2O_3+Ga_2O_3$ and from 0.1 to 10 mol % of $CeO_2$.

9. The glass fiber according to claim 1, wherein the core glass does not contain Er.

10. An optical switch comprising the glass fiber according to claim 1.

11. A wavelength conversion device comprising the glass fiber according to claim 1.

12. The glass fiber according to claim 1, wherein the core glass does not contain any one of As, S and Se.

13. The glass fiber according to claim 1, wherein the clad glass has a refractive index $n_2$ and the core glass has a refractive index $n_1$, and wherein the following formula is satisfied:

$$0.0005 \leq (n_1-n_2)/n_1 \leq 0.1.$$

14. The glass fiber according to claim 1, wherein the clad glass consists essentially of from 25 to 70 mol % of $Bi_2O_3$, from 5 to 74.89 mol % of $B_2O_3+SiO_2$, from 0.1 to 30 mol % of $Al_2O_3+Ga_2O_3$ and from 0 to 10 mol % of $CeO_2$.

15. The glass fiber according to claim 1, wherein the core glass contains in a total amount of no more than 10 mol % of at least one component selected from the group consisting of $Li_2O$, $Na_2O$, $K_2O$, MgO, CaO, SrO, BaO, ZnO, $TiO_2$, $WO_3$, $SnO_2$ and $TeO_2$.

16. The glass fiber according to claim 1, wherein the core glass contains from 40 to 50 mol % of $Bi_2O_3$, from 30 to 50 mol % of $B_2O_3+SiO_2$, from 5 to 25 mol % of $Al_2O_3+Ga_2O_3$, and from 0.1 to 0.5 mol % of $CeO_2$.

17. The glass fiber according to claim 1, wherein the core glass contains from 40 to 50 mol % of $Bi_2O_3$, from 20 to 35 mol % of $B_2O_3$, from 10 to 40 mol % of from 5 to 15 mol % of $Al_2O_3$, and from 5 to 20 mol % of $Ga_2O_3$.

* * * * *